US012640768B2

(12) United States Patent
Yang et al.

(10) Patent No.: US 12,640,768 B2
(45) Date of Patent: May 26, 2026

(54) TRANSCEIVER APPARATUS HAVING SELF-CALIBRATION MECHANISM AND SELF-CALIBRATION METHOD THEREOF

(71) Applicant: REALTEK SEMICONDUCTOR CORPORATION, Hsinchu (TW)

(72) Inventors: Hung-Yuan Yang, Hsinchu (TW); Hung-Min Lin, Hsinchu (TW); Yun-Ru Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 416 days.

(21) Appl. No.: 18/206,262

(22) Filed: Jun. 6, 2023

(65) Prior Publication Data

US 2024/0014844 A1     Jan. 11, 2024

(30) Foreign Application Priority Data

Jul. 8, 2022    (TW) ................................... 111125834

(51) Int. Cl.
H04B 1/44          (2006.01)
H04B 1/10          (2006.01)
(52) U.S. Cl.
CPC ..................................... H04B 1/44 (2013.01)
(58) Field of Classification Search
CPC ... H04B 1/38; H04B 1/40; H04B 1/44; H04B 1/50; H04B 1/52; H04B 1/525;
(Continued)

(56) References Cited

U.S. PATENT DOCUMENTS 6,421,398 B1    7/2002  McVey
7,856,048 B1   12/2010  Smaini
(Continued)

FOREIGN PATENT DOCUMENTS

WO      WO2003094463 A1    11/2003

OTHER PUBLICATIONS

OA letter of a counterpart TW application (appl. No. 111125834) mailed on Jul. 14, 2023. Summary of the TW OA letter: 1. Claims 1-10 are rejected as allegedly being unpatentable in view of cited reference 1 (US2019/0052373A1). Correspondence bewteen claims of TW counterpart application and claims of US application: 1. Claims 1, 2-3, . . . , and 10 in TW counterpart application correspond to claims 1, 2, 4, . . . and 11 in US application, respectively.

*Primary Examiner* — Quochien B Vuong
(74) *Attorney, Agent, or Firm* — WPAT, PC

(57)                ABSTRACT

The present disclosure discloses a transceiver apparatus having self-calibration mechanism that includes a signal transmission path, a signal receiving path, a path switching circuit, a transceiver circuit and a self-calibration circuit. The path switching circuit includes a switch to switch a connection relation among an antenna, the signal transmission path and the signal receiving path. The transceiver circuit is coupled to the signal transmission path and the signal receiving path. The self-calibration circuit controls the transceiver circuit to transmit a transmission signal through the signal transmission path to the path switching circuit and receives a leakage signal generated according to the transmission signal through the signal receiving path, so as to perform a self-calibration process on the transceiver circuit based on the transmission signal and the leakage signal. The leakage signal has a leakage signal strength larger than a predetermined level.

14 Claims, 3 Drawing Sheets

(58) Field of Classification Search
CPC ... H04B 1/54; H04B 1/02; H04B 1/04; H04B
2001/0408; H04B 1/06; H04B 1/10;
H04B 1/16
See application file for complete search history.

(56) References Cited

U.S. PATENT DOCUMENTS

| | | | |
|---|---|---|---|
| 8,175,549 B2 | 5/2012 | Faust | |
| 8,559,488 B1 | 10/2013 | Smaini | |
| 9,722,647 B2 * | 8/2017 | Talty | H04B 1/40 |
| 10,476,612 B2 * | 11/2019 | Haub | H04B 1/38 |
| 10,972,150 B2 * | 4/2021 | Keehr | H04B 1/38 |
| 2007/0082617 A1 * | 4/2007 | McCallister | H04B 1/0475 |
| | | | 455/63.1 |
| 2010/0015936 A1 | 1/2010 | Mo | |
| 2019/0052373 A1 | 2/2019 | Haub et al. | |

* cited by examiner

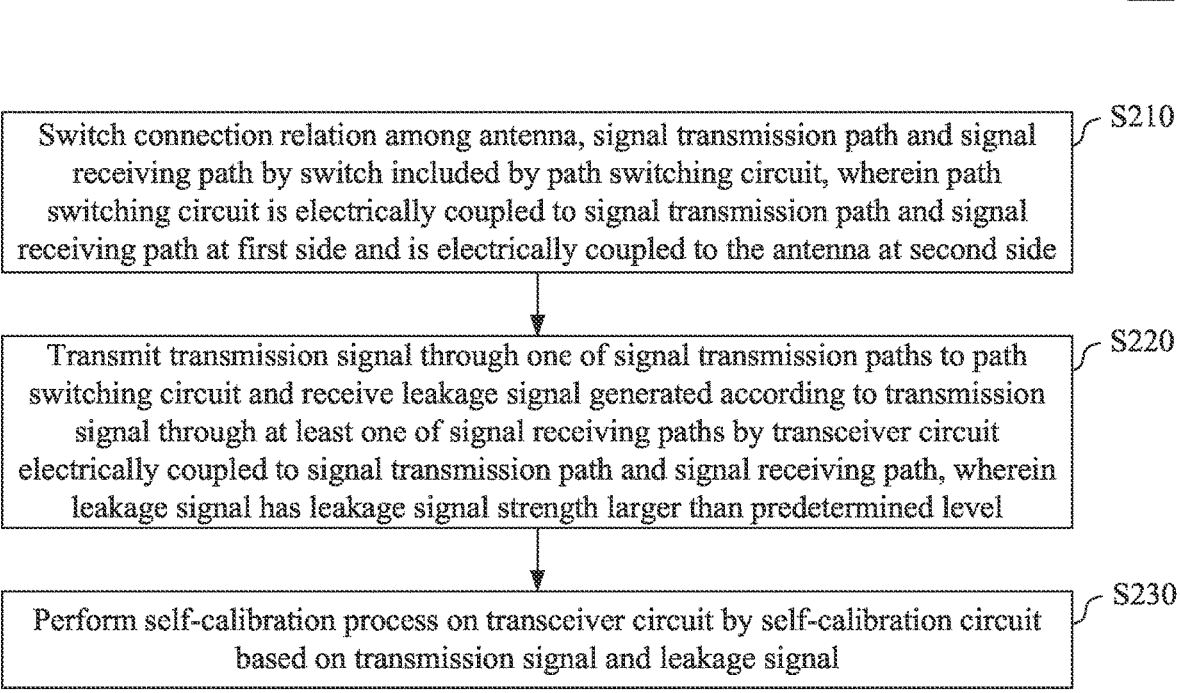

200

Switch connection relation among antenna, signal transmission path and signal receiving path by switch included by path switching circuit, wherein path switching circuit is electrically coupled to signal transmission path and signal receiving path at first side and is electrically coupled to the antenna at second side ⟋ S210

Transmit transmission signal through one of signal transmission paths to path switching circuit and receive leakage signal generated according to transmission signal through at least one of signal receiving paths by transceiver circuit electrically coupled to signal transmission path and signal receiving path, wherein leakage signal has leakage signal strength larger than predetermined level ⟋ S220

Perform self-calibration process on transceiver circuit by self-calibration circuit based on transmission signal and leakage signal ⟋ S230

Fig. 2

TRANSCEIVER APPARATUS HAVING SELF-CALIBRATION MECHANISM AND SELF-CALIBRATION METHOD THEREOF

BACKGROUND OF THE INVENTION

1. Field of the Invention

The present disclosure relates to a transceiver apparatus having self-calibration mechanism and a self-calibration method thereof.

2. Description of Related Art

Wireless network communication technology is not limited by physical connection wires and thus becomes the mainstream network technology. However, for a transceiver apparatus used to transmit and receive signals, the conditions of in phase and quadrature components (IQ) mismatch, distortion, local oscillator leakage and DC offset may occur to the circuit components therein due to the design flaw or the offset of the manufacturing process. A self-calibration is therefore required. In order to perform self-calibration, the transceiver apparatus needs to include additional circuits such that the cost thereof increases.

SUMMARY OF THE INVENTION

In consideration of the problem of the prior art, an object of the present disclosure is to provide a transceiver apparatus having self-calibration mechanism and a self-calibration method thereof.

The present invention discloses a transceiver apparatus having self-calibration mechanism that includes a signal transmission path, a signal receiving path, a path switching circuit, a transceiver circuit and a self-calibration circuit. The path switching circuit is coupled to the signal transmission path and the signal receiving path at a first side, is coupled to an antenna at a second side and includes a switch to switch a connection relation among the antenna, the signal transmission path and the signal receiving path. The transceiver circuit is coupled to the signal transmission path and the signal receiving path. The self-calibration circuit is configured to control the transceiver circuit to transmit a transmission signal through the signal transmission path to the path switching circuit and receive a leakage signal generated according to the transmission signal through the signal receiving path, so as to perform a self-calibration process on the transceiver circuit based on the transmission signal and the leakage signal, wherein the leakage signal has a leakage signal strength larger than a predetermined level.

The present invention also discloses a self-calibration method of a transceiver apparatus. The self-calibration method includes steps outlined below. A connection relation among an antenna, a signal transmission path and a signal receiving path is switched by a switch included by a path switching circuit, wherein the path switching circuit is coupled to the signal transmission path and the signal receiving path at a first side and is coupled to the antenna at a second side. A transmission signal is transmitted through the signal transmission path to the path switching circuit and a leakage signal generated according to the transmission signal is received through the signal receiving path by a transceiver circuit coupled to the signal transmission path and the signal receiving path, wherein the leakage signal has a leakage signal strength larger than a predetermined level. A self-calibration process is performed on the transceiver circuit by a self-calibration circuit based on the transmission signal and the leakage signal.

These and other objectives of the present disclosure will no doubt become obvious to those of ordinary skill in the art after reading the following detailed description of the preferred embodiments that are illustrated in the various figures and drawings.

BRIEF DESCRIPTION OF THE DRAWINGS

FIG. 2 illustrates a flow chart of a self-calibration method of a transceiver apparatus according to an embodiment of the present invention.

DETAILED DESCRIPTION OF THE PREFERRED EMBODIMENTS

An aspect of the present invention is to provide a transceiver apparatus having self-calibration mechanism and a self-calibration method thereof to generate the leakage signal according to the transmission signal transmitted by transceiver circuit by using the path switching circuit such that the self-calibration circuit performs self-calibration according to the leakage signal. The self-calibration mechanism can be accomplished without the disposition of additional circuits.

Figure 1A:
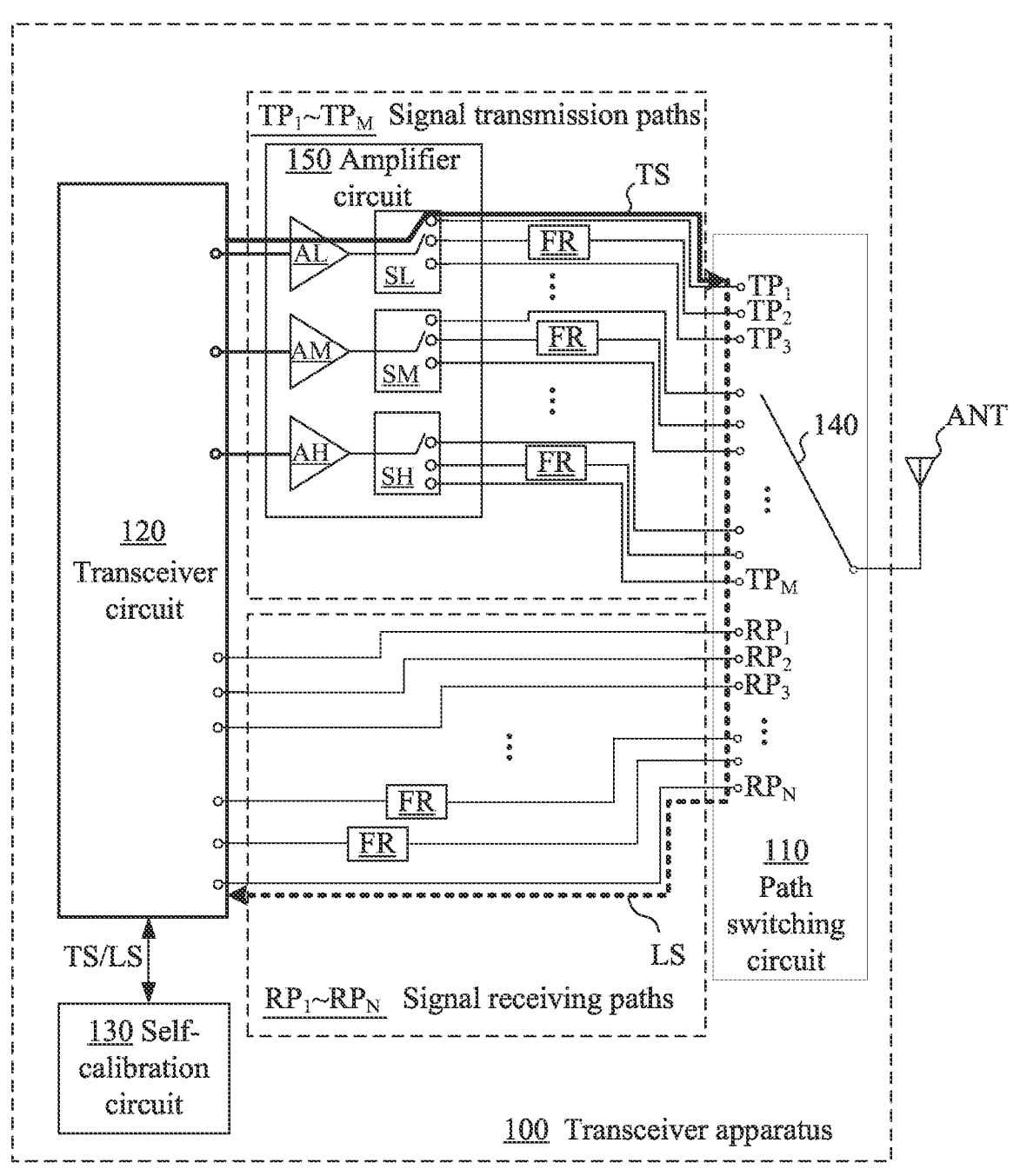
FIG. 1A illustrates a block diagram of a transceiver apparatus having self-calibration mechanism according to an embodiment of the present invention.

Reference is now made to FIG. 1A. FIG. 1A illustrates a block diagram of a transceiver apparatus 100 having self-calibration mechanism according to an embodiment of the present invention. The transceiver apparatus 100 includes a plurality of signal transmission paths $TP_1 \sim TP_M$, a plurality of signal receiving paths $RP_1 \sim RP_N$, a path switching circuit 110, a transceiver circuit 120 and a self-calibration circuit 130.

The number of the signal transmission paths $TP_1 \sim TP_M$ is M and the number of the signal receiving paths $RP_1 \sim RP_N$ is N, in which each of M and N is a positive integer and M and N are not necessarily equal to each other. Each of the signal transmission paths $TP_1 \sim TP_M$ and the signal receiving paths $RP_1 \sim RP_N$ corresponds to a signal frequency band. In an embodiment, at least a part of the signal transmission paths $TP_1 \sim TP_M$ and the signal receiving paths $RP_1 \sim RP_N$ includes a filter FR.

The path switching circuit 110 is electrically coupled to the signal transmission paths $TP_1 \sim TP_M$ and the signal receiving paths $RP_1 \sim RP_N$ at a first side and is electrically coupled to an antenna ANT at a second side. In the present embodiment, the path switching circuit 110 is a single pole multiple throw switch circuit that includes one switch 140 to switch the connection relation among the antenna ANT, the signal transmission paths $TP_1 \sim TP_M$ and the signal receiving paths $RP_1 \sim RP_N$.

The transceiver circuit 120 is electrically coupled to the signal transmission paths $TP_1 \sim TP_M$ and the signal receiving paths $RP_1 \sim RP_N$.

In an embodiment, the transceiver circuit 120 may include at least one transmission circuit (not illustrated in the figure) and the transmission circuit may include such as but not limited to a digital signal processing circuit, a digital-to-analog conversion circuit, a filter circuit and a mixer circuit (not illustrated in the figure) to perform processing on the signal transmitted to an external terminal in turn in the low frequency range, the middle frequency range and the high frequency range.

Further, the transceiver circuit 120 may include at least one receiving circuit (not illustrated in the figure) and the receiving circuit may include such as but not limited to a mixer circuit, a filter circuit, an analog-to-digital conversion circuit and a digital signal processing circuit (not illustrated in the figure) to perform processing on the signal received to the internal circuit in turn in the high frequency range, the middle frequency range and the low frequency range.

It is appreciated that the configuration of the transceiver circuit 120 described above is merely an example. In other embodiments, the transceiver circuit 120 may also include other circuits to perform signal transmission and receiving. The present invention is not limited to a certain configuration.

In FIG. 1A, the self-calibration circuit 130 is illustrated as a circuit independent from the transceiver circuit 120. However, in other embodiments, the self-calibration circuit 130 can be a circuit disposed in the transceiver circuit 120. The self-calibration circuit 130 is configured to control the transceiver circuit 120 to transmit a transmission signal TS through one of the signal transmission paths $TP_1 \sim TP_M$ (e.g., the signal transmission path $TP_1$ in FIG. 1A) to the path switching circuit 110, and receive a leakage signal LS generated according to the transmission signal TS through at least one of the signal receiving paths $RP_1 \sim RP_N$ (e.g., the signal receiving path $RP_N$ in FIG. 1A) so as to perform at least one self-calibration process on the transceiver circuit 120 based on the transmission signal TS and the leakage signal LS, wherein the leakage signal LS has a leakage signal strength larger than a predetermined level. The predetermined level is larger than or equal to a lowest amount of the signal strength of a signal that the transceiver apparatus 100 can receive. In an embodiment, based on the requirement of a communication protocol standard that the transceiver circuit 120 is required to satisfy (such as but not limited to 3GPP or IEEE 802.11 standard), the value of the predetermined level can be in a range from −90 dBm to −100 dBm.

In an embodiment, the transceiver apparatus 100 further includes an amplifier circuit 150 disposed at the signal transmission paths $TP_1 \sim TP_M$ and configured to perform power amplification on the signal transmitted by the transceiver circuit 120, e.g., the transmission signal TS. In FIG. 1A, the amplifier circuit 150 includes an amplifier AL, an amplifier AM, an amplifier AH, a switch circuit SL, a switch circuit SM and a switch circuit SH. In an embodiment, each of the amplifier AL, the amplifier AM and the amplifier AH included in the amplifier circuit 150 may correspond to one or more than one transmission circuits in the transceiver circuit 120 based on practical requirements to receive the signal supposed to be transmitted.

The amplifier AL performs amplification on the signal in a relative lower frequency range and selects one of the signal transmission paths $TP_1 \sim TP_M$ to transmit the signal through the switch circuit SL. The amplifier AM performs amplification on the signal in a middle frequency range and selects one of the signal transmission paths $TP_1 \sim TP_M$ to transmit the signal through the switch circuit SM. The amplifier AH performs amplification on the signal in a relative higher frequency range and selects one of the signal transmission paths $TP_1 \sim TP_M$ to transmit the signal through the switch circuit SH.

In an embodiment, the transmission signal TS has an initial signal strength when being generated by the transceiver circuit 120. After the amplification of amplifier circuit 150 and the transmission of the signal transmission paths $TP_1 \sim TP_M$, the transmission signal TS transmitted to the path switching circuit 110 has a transmission signal strength. The path switching circuit 110 maintains an isolation amount between the signal transmission paths $TP_1 \sim TP_M$ and the signal receiving paths $RP_1 \sim RP_N$. The leakage signal strength of the leakage signal LS described above is a difference between the transmission signal strength and the isolation amount.

In an embodiment, when the transceiver circuit 120 performs normal signal receiving, the signal strength of the signal from an external terminal processed by the transceiver circuit 120 is mainly within a range of a predetermined level. In a numerical example, an original signal strength is −3 dBm, the transmission signal strength is 24 dBm, the isolation amount is 50 dB. The leakage signal strength is −26 dBm (24−50=−26).

As a result, the leakage signal strength in such a numerical example is far larger than the predetermined level. The strength of the leakage signal LS received by the self-calibration circuit 130 has a sufficient reliability. Even the one of the signal receiving paths $RP_1 \sim RP_N$ that generates the leakage signal LS includes a filter FR such that the leakage signal strength further drops, the leakage signal strength is still large enough, compared to the predetermined level, such that the self-calibration circuit 130 is able to perform self-calibration accordingly.

In an embodiment, after receiving the leakage signal LS, the self-calibration circuit 130 may determine whether the strength of the leakage signal LS is larger than the predetermined level so as to perform the self-calibration process after the strength of the leakage signal LS is determined to be larger than the predetermined level.

The self-calibration process performed by the self-calibration circuit 130 may include such as, but not limited to an IQ image rejection calibration, a digital pre-distortion calibration, a LO leakage calibration, DC offset calibration, a transmitter output power calibration or a combination thereof, to perform calibration on different circuit components included in the transceiver circuit 120.

In an embodiment, the transceiver circuit 120 may transmit the transmission signal TS through one of the signal transmission paths $TP_1 \sim TP_M$ and receives a plurality of leakage signals LS through more than one of the signal receiving paths $RP_1 \sim RP_N$. The different leakage signals LS have different characteristics since these signals pass through the different signal receiving paths $RP_1 \sim RP_N$. The transceiver circuit 120 may perform more than one of the self-calibration processes described above simultaneously on the transceiver circuit 120 according to the transmission signal TS and the appropriate leakage signals LS, in which these self-calibration processes do not need to be performed in a time-division manner.

Further, in an embodiment, when the self-calibration circuit 130 performs the self-calibration process, the transceiver circuit 120 may simultaneously performs at least one of signal transmission and signal receiving through the signal transmission paths $TP_1 \sim TP_M$ and the signal receiving paths $RP_1 \sim RP_N$ not corresponding to the performance of the self-calibration process. As a result, the self-calibration circuit 130 can perform self-calibration process when the transceiver circuit 120 operates in real-time.

Moreover, in an embodiment, due to the leakage characteristic of the path switching circuit 110 itself between the signal transmission paths $TP_1 \sim TP_M$ and the signal receiving paths $RP_1 \sim RP_N$, the path switching circuit 110 does not need to electrically couple the one of the signal transmission paths $TP_1\text{~}TP_M$ that transmits the transmission signal TS (e.g., the signal transmission path TP1 in FIG. 1A) to the antenna ANT when the self-calibration circuit 130 performs self-calibration process. More specifically, even if the transmission signal TS is only transmitted to the path switching circuit 110 without reaching the antenna ANT, the signal receiving paths $RP_1\text{~}RP_N$ can still generate the leakage signal LS accordingly.

It is appreciated that in FIG. 1A, a single pole multiple throw switch circuit is illustrated and described as an example of the path switching circuit 110. However, the self-calibration mechanism described above can also be applied to the transceiver apparatus 100 that includes the path switching circuit 110 implemented by a multiple pole multiple throw switch circuit. Under such a configuration, the path switching circuit 110 implemented by the multiple pole multiple throw switch circuit is electrically coupled to more than one antennas ANT to switch the connection relation among the antennas ANT, the signal transmission paths $TP_1\text{~}TP_M$ and the signal receiving paths $RP_1\text{~}RP_N$ according to a plurality of switches disposed therein.

In some approaches, the self-calibration of the transceiver apparatus requires an additional detection circuit to detect the power of the transmission signal or an additional feedback circuit to feedback the transmission signal such that the self-calibration is performed according to the detected or feedback transmission signal. Not only the cost of the circuit increases, but also the self-calibration cannot be performed independently from the real-time transmission signals.

The transceiver apparatus having self-calibration mechanism of the present invention generates the leakage signal according to the transmission signal transmitted by transceiver circuit by using the path switching circuit such that the self-calibration circuit performs self-calibration according to the leakage signal. The self-calibration mechanism can be accomplished without the disposition of additional circuits.

Figure 1B:
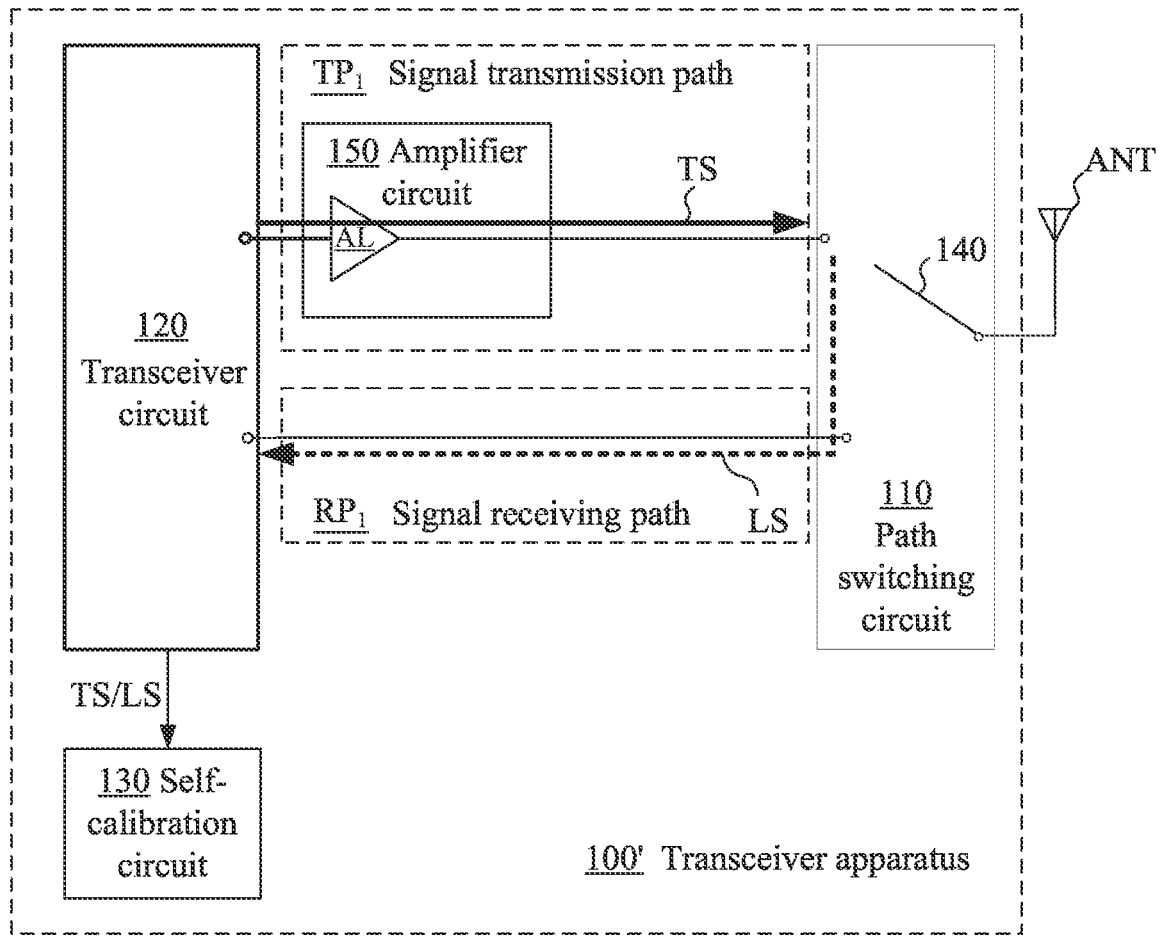
FIG. 1B illustrates a block diagram of a transceiver apparatus having self-calibration mechanism according to another embodiment of the present invention.

Reference is now made to FIG. 1B. FIG. 1B illustrates a block diagram of a transceiver apparatus 100' having self-calibration mechanism according to another embodiment of the present invention. The transceiver apparatus 100' includes the signal transmission path $TP_1$, the signal receiving path $RP_1$, the path switching circuit 110, the transceiver circuit 120 and the self-calibration circuit 130.

In the embodiment described above, the apparatus that includes more than one signal transmission paths and more than one signal receiving paths is used as an example. However, in the present embodiment, the transceiver apparatus 100' may only include a single signal transmission path $TP_1$ and a single signal receiving path $RP_1$.

The path switching circuit 110 is configured to switch the connection relation among the antenna ANT, the signal transmission path $TP_1$ and the signal receiving path $RP_1$. The transceiver circuit 120 is electrically coupled to signal transmission path $TP_1$ and signal receiving path $RP_1$. The self-calibration circuit 130 controls the transceiver circuit 120 to transmit the transmission signal TS through the signal transmission path $TP_1$ to the path switching circuit 110, and receives the leakage signal LS generated according to the transmission signal TS through the signal receiving path $RP_1$, so as to perform self-calibration process on the transceiver circuit 120 according to the transmission signal TS and the leakage signal LS. The configuration and operation of each of the components in FIG. 1B are identical to those of the components in FIG. 1A. The detail is therefore not described herein.

Reference is now made to FIG. 2. FIG. 2 illustrates a flow chart of a self-calibration method 200 according to an embodiment of the present invention.

Besides the apparatus described above, the present invention further discloses the self-calibration method 200 that can be used in such as, but not limited to the transceiver apparatus 100 illustrated in FIG. 1A or the transceiver apparatus 100' illustrated in FIG. 1B. An embodiment of the self-calibration method 200 is illustrated in FIG. 2 by taking the transceiver apparatus 100 in FIG. 1A as an example and includes the steps outlined below.

In step S210, the connection relation among the antenna ANT, the signal transmission paths $TP_1\text{~}TP_M$ and the signal receiving paths $RP_1\text{~}RP_N$ is switched by the switch 140 included by the path switching circuit 110, wherein the path switching circuit 110 is electrically coupled to the signal transmission paths $TP_1\text{~}TP_M$ and the signal receiving paths $RP_1\text{~}RP_N$ at the first side and is electrically coupled to the antenna ANT at the second side.

In step S220, the transmission signal TS is transmitted through one of the signal transmission paths $TP_1\text{~}TP_M$ to the path switching circuit 110 and the leakage signal LS generated according to the transmission signal TS is received through at least one of the signal receiving paths $RP_1\text{~}RP_N$ by the transceiver circuit 120 electrically coupled to the signal transmission paths $TP_1\text{~}TP_M$ and the signal receiving paths $RP_1\text{~}RP_N$, wherein the leakage signal LS has the leakage signal strength larger than the predetermined level.

In step S230, the self-calibration process is performed on the transceiver circuit 120 by the self-calibration circuit 130 based on the transmission signal TS and the leakage signal LS.

It is appreciated that the embodiments described above are merely an example. In other embodiments, it is appreciated that many modifications and changes may be made by those of ordinary skill in the art without departing, from the spirit of the invention.

In summary, the transceiver apparatus having self-calibration mechanism and the self-calibration method thereof generate the leakage signal according to the transmission signal transmitted by transceiver circuit by using the path switching circuit such that the self-calibration circuit performs self-calibration according to the leakage signal. The self-calibration mechanism can be accomplished without the disposition of additional circuits.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A transceiver apparatus having self-calibration mechanism, comprising:

a plurality of signal transmission paths and a plurality of signal receiving paths;

a path switching circuit coupled to the signal transmission paths and the signal receiving paths at a first side, coupled to an antenna at a second side and comprising a switch to switch a connection relation among the antenna, the signal transmission paths and the signal receiving paths;

a transceiver circuit coupled to the signal transmission path and the signal receiving path; and a self-calibration circuit configured to control the transceiver circuit to transmit a transmission signal through one of the signal transmission paths to the path switching circuit and receive a leakage signal generated according to the transmission signal through the signal receiving paths, so as to perform a plurality of different self-calibration processes on the transceiver circuit based on the transmission signal and the leakage signal, wherein the leakage signal has a leakage signal strength larger than a predetermined level.

2. The transceiver apparatus of claim 1, wherein at least a part of the signal transmission paths and at least a part of the signal receiving paths comprises a filter.

3. The transceiver apparatus of claim 1, wherein when the self-calibration circuit performs the self-calibration process, the transceiver circuit simultaneously performs at least one of signal transmission and signal receiving through the signal transmission paths and the signal receiving paths not corresponding to the performance of the self-calibration process.

4. The transceiver apparatus of claim 1, wherein the transmission signal transmitted to the path switching circuit has a transmission signal strength, the path switching circuit generates an isolation amount between the signal transmission paths and the signal receiving paths, and the leakage signal strength is a difference between the transmission signal strength and the isolation amount.

5. The transceiver apparatus of claim 1, wherein the path switching circuit is a single pole multiple throw switch circuit coupled to a single antenna or a multiple pole multiple throw switch circuit coupled to a plurality of antennas.

6. The transceiver apparatus of claim 1, further comprising an amplifier circuit disposed at the signal transmission paths and configured to perform power amplification on the transmission signal.

7. The transceiver apparatus of claim 1, wherein the self-calibration process comprises an IQ image rejection calibration, a digital pre-distortion calibration, a LO leakage calibration, DC offset calibration, a transmitter output power calibration or a combination thereof.

8. A self-calibration method of a transceiver apparatus, the self-calibration method comprising:

switching a connection relation among an antenna, a plurality of signal transmission paths and a plurality of signal receiving paths by a switch comprised by a path switching circuit, wherein the path switching circuit is coupled to the signal transmission paths and the signal receiving paths at a first side and is coupled to the antenna at a second side;

transmitting a transmission signal through one of the signal transmission paths to the path switching circuit and receiving a leakage signal generated according to the transmission signal through the signal receiving paths by a transceiver circuit coupled to the signal transmission paths and the signal receiving paths, wherein the leakage signal has a leakage signal strength larger than a predetermined level; and performing a plurality of different self-calibration processes on the transceiver circuit by a self-calibration circuit based on the transmission signal and the leakage signal.

9. The self-calibration method of claim 8, wherein at least a part of the signal transmission paths and at least a part of the signal receiving paths comprises a filter.

10. The self-calibration method of claim 8, further comprising:

when the self-calibration circuit performs the self-calibration process, simultaneously performing at least one of signal transmission and signal receiving through the signal transmission paths and the signal receiving paths not corresponding to the performance of the self-calibration process by the transceiver circuit.

11. The self-calibration method of claim 8, wherein the transmission signal transmitted to the path switching circuit has a transmission signal strength, the path switching circuit generates an isolation amount between the signal transmission paths and the signal receiving paths, and the leakage signal strength is a difference between the transmission signal strength and the isolation amount.

12. The self-calibration method of claim 8, wherein the path switching circuit is a single pole multiple throw switch circuit coupled to a single antenna or a multiple pole multiple throw switch circuit coupled to a plurality of antennas.

13. The self-calibration method of claim 8, wherein the transceiver apparatus further comprises an amplifier circuit disposed at the signal transmission paths, the self-calibration method further comprises:

performing power amplification on the transmission signal by the amplifier circuit.

14. The self-calibration method of claim 8, wherein the self-calibration process includes an IQ image rejection calibration, a digital pre-distortion calibration, a LO leakage calibration, DC offset calibration, a transmitter output power calibration or a combination thereof.

* * * * *